(12) United States Patent
Hoegh et al.

(10) Patent No.: US 8,915,216 B2
(45) Date of Patent: Dec. 23, 2014

(54) KENNEL WITH AUTOMATICALLY OPENING DOOR

(76) Inventors: Thomas Barry Hoegh, Edina, MN (US); Timothy Harold Grafe, Edina, MN (US)

(*) Notice: Subject to any disclaimer, the term of this patent is extended or adjusted under 35 U.S.C. 154(b) by 256 days.

(21) Appl. No.: 13/412,371

(22) Filed: Mar. 5, 2012

(65) Prior Publication Data

US 2013/0068172 A1    Mar. 21, 2013

Related U.S. Application Data

(63) Continuation-in-part of application No. 11/740,972, filed on Apr. 27, 2007, now Pat. No. 8,127,718.

(60) Provisional application No. 60/745,910, filed on Apr. 28, 2006.

(51) Int. Cl.
*A01K 1/03*    (2006.01)
*A01K 15/04*   (2006.01)

(52) U.S. Cl.
USPC .......................................... 119/481; 119/721

(58) Field of Classification Search
USPC ......... 119/481, 712, 859, 719, 721, 720, 905; 340/573.3
See application file for complete search history.

(56) References Cited

U.S. PATENT DOCUMENTS

| | | | |
|---|---|---|---|
| 3,505,979 A * | 4/1970 | Rosswag | 119/772 |
| 3,897,753 A | 8/1975 | Lee et al. | |
| 4,205,628 A * | 6/1980 | Null | 119/700 |
| 4,216,743 A | 8/1980 | Cohen | |
| 4,224,899 A | 9/1980 | Cruchelow et al. | |
| 4,418,493 A * | 12/1983 | Jordan | 43/67 |
| 4,497,133 A | 2/1985 | Blenkinsop | |
| 4,513,686 A | 4/1985 | Demko | |
| 4,823,010 A | 4/1989 | Kornbrekke et al. | |
| 4,908,484 A | 3/1990 | Gunoff | |
| 5,061,918 A | 10/1991 | Hunter | |
| 5,177,900 A | 1/1993 | Solowiej | |
| 5,183,008 A | 2/1993 | Carrano | |
| 5,370,080 A | 12/1994 | Koepp | |
| 5,392,025 A * | 2/1995 | Figh et al. | 340/547 |
| 5,469,807 A | 11/1995 | Kosmaczeska | |
| 5,579,719 A * | 12/1996 | Hoff et al. | 119/51.02 |
| 5,651,331 A | 7/1997 | Cleri, Jr. | |
| 5,992,096 A | 11/1999 | De La Cerda et al. | |
| 6,135,055 A | 10/2000 | Pratt | |

(Continued)

OTHER PUBLICATIONS

Non-Final Office Action, mailed Apr. 12, 2011 in co-pending U.S. Appl. No. 11/740,972, "Kennel With Automatically Opening Door," (6 pages).

(Continued)

*Primary Examiner* — Yvonne Abbott
(74) *Attorney, Agent, or Firm* — Pauly, Devries Smith & Deffner, LLC

(57) ABSTRACT

The present invention seeks to prevent damage to property resulting from an animal's separation anxiety which occurs when a pet owner departs, while minimizing the period of time the dog is confined. The device incorporates an automatically releasing door of a kennel or leash. For instance, the owner of a canine can place the dog in a kennel prior to leaving his or her residence. The owner can initiate a timer on the kennel or leash, and the kennel door opens or leash releases after a pre-determined amount of time, such as 30 minutes.

25 Claims, 3 Drawing Sheets

(56) References Cited

U.S. PATENT DOCUMENTS

| | | |
|---|---|---|
| 6,141,911 A | 11/2000 | Reid |
| 6,148,766 A | 11/2000 | van der Lely |
| 6,152,081 A | 11/2000 | Baker |
| 6,185,773 B1 * | 2/2001 | Goedde ........................ 340/540 |
| 6,297,739 B1 | 10/2001 | Small |
| 6,341,582 B1 | 1/2002 | Gompper et al. |
| 6,560,926 B1 | 5/2003 | Gillett |
| 6,651,592 B2 | 11/2003 | Maddox et al. |
| 6,666,167 B1 | 12/2003 | Carlson |
| 6,691,463 B1 | 2/2004 | Richmond |
| 6,710,714 B2 | 3/2004 | Conway |
| 6,745,788 B1 | 6/2004 | Brown |
| 6,904,868 B2 | 6/2005 | Block et al. |
| 6,939,894 B2 | 9/2005 | Takahashi et al. |
| 6,944,990 B2 | 9/2005 | Noyes |
| 6,955,138 B2 * | 10/2005 | DeBien ........................ 119/776 |
| 6,959,511 B2 | 11/2005 | Johnson et al. |
| 6,966,147 B2 * | 11/2005 | Solowiej ........................ 49/169 |
| 7,328,671 B2 | 2/2008 | Kates |
| 7,334,537 B2 | 2/2008 | Van Den Berg et al. |
| 7,393,023 B1 * | 7/2008 | Kelly ........................... 292/144 |
| 7,481,471 B2 * | 1/2009 | Andersen et al. ........... 292/251.5 |
| 7,916,016 B2 * | 3/2011 | Auerbach et al. ......... 340/539.26 |
| 7,954,211 B2 * | 6/2011 | De Bien ......................... 24/606 |
| 8,104,221 B2 * | 1/2012 | Walter et al. ...................... 43/61 |
| 8,127,718 B2 | 3/2012 | Hoegh et al. |
| 8,578,742 B2 * | 11/2013 | Shulman ........................... 70/16 |
| 2003/0221631 A1 | 12/2003 | Yarbrough |
| 2003/0230124 A1 * | 12/2003 | Johnson et al. ................. 70/267 |
| 2004/0194714 A1 | 10/2004 | Lee |
| 2007/0181069 A1 * | 8/2007 | Jack ............................. 119/61.1 |
| 2008/0072843 A1 | 3/2008 | Malacarne et al. |
| 2008/0156274 A1 | 7/2008 | Andrade et al. |
| 2008/0264349 A1 | 10/2008 | Hoegh et al. |
| 2009/0211316 A1 * | 8/2009 | Butler et al. ...................... 70/16 |
| 2009/0307961 A1 | 12/2009 | Walter et al. |

OTHER PUBLICATIONS

Notice of Allowance Received, mailed Oct. 18, 2011 in co-pending U.S. Appl. No. 11/740,972, "Kennel With Automatically Opening Door" (5 pages).

* cited by examiner

KENNEL WITH AUTOMATICALLY OPENING DOOR

RELATED APPLICATION

This application claims priority from U.S. Provisional Patent Application No. 60/745,910, by Thomas Hoegh, filed on Apr. 28, 2006, and U.S. Utility patent application Ser. No. 11/740,972, filed Apr. 27, 2007; both of which are incorporated herein in their entirety.

FIELD OF THE INVENTION

This invention relates to improved kennels for pets, especially dogs.

BACKGROUND

It is well known that canine pets experience separation anxiety when their owners leave, and as a result of that anxiety, exhibit behavior problems such as digging, chewing, scratching, barking or eliminating indoors.

Canine experts recommend a variety of methods for alleviating a dog's separation anxiety. Some of these methods include feeding the dog before leaving, exercising the dog before leaving, leaving the radio on, giving the dog a toy to play with, administering anti-anxiety medication, or placing the dog in a large kennel. Confining the dog to a kennel is an effective way to prevent damage to property but many pet owners view that this is not an ideal situation, because the canine is confined, it may not have access to food and/or water, it cannot exercise and cannot relieve itself.

Experts contend that canines have little sense of the passage of time. As a result, once the initial period of anxiety has passed, the canine is generally calm and less prone to causing physical destruction to its surroundings.

It is the object of the present invention to provide a product (and methods of using the product) that overcomes the problems inherent with kennel confinement, or in cases where a kennel is not currently used, to introduce a kennel or other temporary restraining device (such as a releasable leash) to pet owners who are experiencing destructive behavior caused by their dog's separation anxiety.

While there are a variety of kennel designs disclosed in the prior art, there are no designs that are suitable for relieving the anxiety of dog while also providing the dog with the possibility of mobility.

U.S. Pat. No. 6,939,894 to Takahashi describes a pharmaceutical approach to reduce a dog's barking. However, this solution does not prevent damage, is costly, and has unwanted side effects.

U.S. Pat. No. 6,651,592, Maddox et al, describes a system for rewarding an animal's behavior and automatically dispensing treats. However, this invention does not address the issue of separation anxiety.

U.S. Pat. No. 6,745,788 to Brown describes a novel tent enclosure for an animal with an automatically closing door, but does not address the issue of separation anxiety, nor does it teach an automatically opening door.

U.S. Pat. No. 4,224,899 to Cruchelow et al describes an enclosure for an animal that is a transitional housing between a residence and the outdoors. However, this device does not address the issue of separation anxiety.

U.S. Pat. No. 6,691,463 to Richmond describes an improved kennel door, but does not teach automatic opening or other means to address a canine's anxiety.

U.S. Pat. No. 3,897,753 to Lee et al describes a system for allowing an animal's selective access to and restriction from certain areas for activities such as feeding. However, this device does not teach automatically opening kennel doors based on some event, such as the passage of time or behavior of a dog.

U.S. Pat. No. 5,061,918 to Hunter describes a system of bio-feedback for detecting unwanted animal behavior and creating a disturbing noise to reduce the animal's behavior. While this invention is directed at improving animal behavior, it can cause pain and does not teach enclosing or restraining an animal.

U.S. Pat. No. 6,152,081 to Baker teaches a novel, open top kennel to control an animal's behavior in the kennel. However, this does not teach a device to allow a dog to exit a kennel.

Several researchers have investigated separation anxiety in pets. One researcher's observations are given as follows: "Preliminary signs of separation anxiety in dogs, such as panting and pacing, often begin as owners prepare to leave. More overt (and destructive) behaviors usually begin minutes after the owner's departure. "The first 30 minutes are the most important," notes Dr. Nicholas Dodman, director of the Behavior Clinic at Tufts University School of Veterinary Medicine. If a dog calmly passes that threshold, it will generally remain calm." From "Your Dog", a monthly newsletter from Tufts School of Veterinary Medicine, 203 Harrison Ave., Boston, Mass.

It is understood that while canine separation anxiety is a well-known phenomenon, the device described herein may apply to other animals.

SUMMARY OF THE INVENTION

The general goal of the present invention is to prevent damage to property resulting from an animal's separation anxiety. This anxiety is typically a consequence of the pet owner's departure. In addition to preventing damage to property, it is a goal of the invention to minimize the period of time the dog is confined. The most common objective is to restrain the animal until it calms down. A similar approach is to reward the animal with a treat once it has calmed down.

The present invention, in a first implementation, includes a device that incorporates an automatically releasing door of a kennel. For instance, the owner of a canine can place the dog in a kennel prior to leaving his or her residence. The owner can then initiate a timer on the kennel. The kennel door will automatically open after a pre-determined amount of time, for instance 30 minutes, or some other amount of time that is sufficient to calm the canine's emotions. After the door is automatically open, the canine is free to exit the kennel for exercise, to access water and/or food, or otherwise explore the dwelling or its surroundings.

An alternative implementation of the invention is directed to a leash designed to release a canine after a set period of time (or in response to a remotely received release signal. The leash is typically constructed so as to have a release mechanism at its distal end (that end which attaches to a dog's collar. The primary function of the mechanism is to retain a clip which can be used to attach to a collar. In one implementation the mechanism is constructed with a timer that releases the clip from the mechanism after a given period of time, thereby releasing the dog. The pet owner can simply tie up the dog with the time-release leash in a location where the dog cannot do significant damage, set the timer and leave.

The present invention as described relates specifically to domesticated pets which in this specification are referred to as animals.

DRAWINGS

The technology will now be described in greater detail, by way of example, with references to the drawings, in which.

Figure 1:
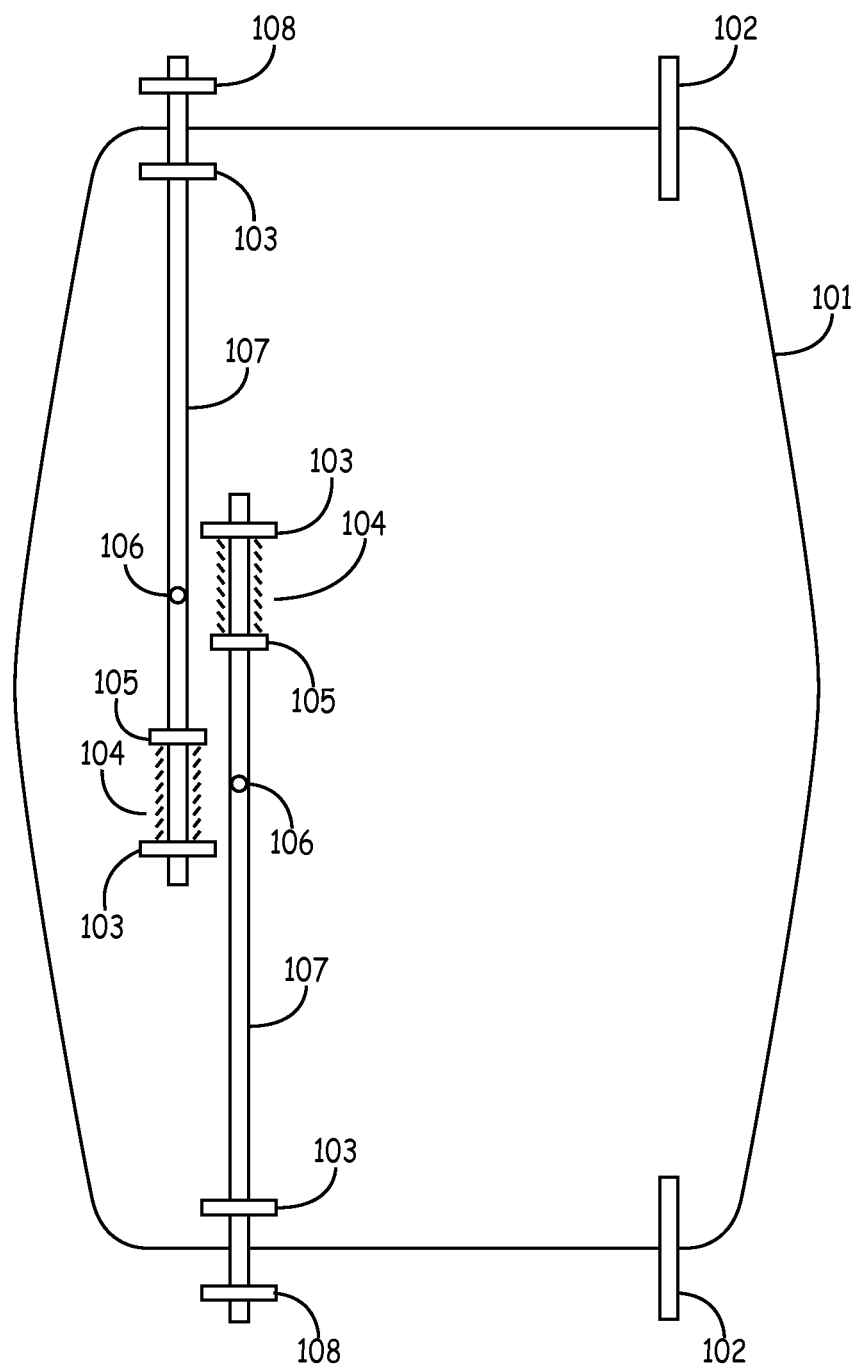
FIG. 1 is a drawing which represents the hinge and latching features found on commonly available kennel gates.

While the invention may be modified in many ways, specifics have been shown by way of example in the drawings and will be described in detail. It should be understood, however, that the intention is not to limit the invention to the particular embodiments described. On the contrary, the intention is to cover all modifications, equivalents, and alternatives following within the scope and spirit of the invention as defined by the claims.

DETAILED DESCRIPTION

The general goal of the present invention is to prevent damage to property resulting from an animal's separation anxiety. This anxiety is typically a consequence of the pet owner's departure. In addition to preventing damage to property, it is a goal of the invention to minimize the period of time the dog is confined. The most common objective is to restrain the animal until it calms down. A similar approach is to reward the animal with a treat once it has calmed down.

The present invention, in a first implementation, includes a device that incorporates an automatically releasing door of a kennel. For instance, the owner of a canine can place the dog in a kennel prior to leaving his or her residence. The owner can then initiate a timer on the kennel. The kennel door will automatically open after a pre-determined amount of time, for instance 30 minutes, or some other amount of time that is sufficient to calm the canine's emotions. The type of timer can vary, being for example a mechanical or electrical device. In some implementations the timer comprises a simple delayed release mechanism that releases the door (or leash in some implementations) after a period of time. The timer does not necessarily need to be highly precise in the time period (although it can be in some implementations). Thus, it can comprise a delayed release mechanism that would vary from 25 to 35 minutes in some implementations, rather than be precisely 30 minutes (or another time). After the door is automatically open, the canine is free to exit the kennel for exercise, to access water and/or food, or otherwise explore the dwelling or its surroundings.

In one embodiment the invention restrains movement of a canine using a restraint and an automatic release of restraint. Another embodiment uses a controller which determines the time of said automatic release of said means of restraint. In another embodiment the time of automatic release is based on the behavior of the restrained canine. In another embodiment the behavior is the restrained canine's movement which may include but is not limited to pacing, breathing, chewing, scratching or tail wagging. In another embodiment the behavior is a sound made by the restrained canine such as breathing, barking, mewing, scratching, gnawing, growling or whining. In another embodiment the time of automatic release is based on a biological parameter of the restrained canine. In another embodiment biological parameter may be heart rate, respiratory rate or respiratory minute volume. In another embodiment the time of automatic release is based on passage of time. In another embodiment time is determined by a mechanical timer. In yet another embodiment passage of time is determined by a timer.

In other embodiments the time of automatic release is based on an external signal. In another embodiment said event is an external signal such as sound, temperature, light, vibration or humidity. In yet another embodiment the external signal is a signal from a phone, computer or other communication device. In yet another embodiment the external signal is the sound or a signal from a fire alarm or smoke detector.

Time-Release Kennel Door

A typical pet kennel has a gate with a latch. In accordance with an implementation of the present invention, a timer is used to trigger an actuator that releases the latch after a certain period of time. In this manner, a pet's owner can put their pet into the kennel, latch the door, set the timer and leave. Ideally, the timer releases the door's latch after the pet's anxiety has subsided.

The functionality of the apparatus can be enhanced by designing the timer to not only unlatch but also open the door to insure the animal is aware that it was no longer confined. The actuator can ideally be designed to allow either manual release of the gate's latch or automatic release by the actuator.

Movement-Dependent Kennel Door

A kennel typically has a door with a latch. The kennel can be outfitted with a device that monitors movement of the animal within. Once the animal's separation anxiety subsides and the animal settles down, the device releases the latch to the kennel door. The activity-monitoring device can be accomplished in a variety of ways: An infrared motion detector can be used to monitor the animal's movement. Load cells can be attached to one or more of the kennel's feet. Once the animal stops moving around, the signal from any such sensor can be used to trigger release of the kennel door latch.

Noise-Dependent Kennel Door

A kennel typically has a door with a latch. The device can be outfitted with a device which monitors noise such as barking in the case of a dog. Once the barking stops the device releases the kennel door latch. The device can also be designed to release the latch only if the animal has stopped barking for a certain period of time.

Tamper-Dependent Kennel Door

A kennel typically has a door with a latch. It is not atypical that the confined dog tampers with the door in an attempt to escape confinement. The door can be fitted with a device to sense such tampering. As long as the animal is tampering with the kennel door the device will not release the kennel door latch. After the animal stops tampering with the kennel door the device will release the kennel door latch. The device can be designed to release the latch only if the animal has stopped tampering with the kennel door for a certain period of time, such as one minute, five minutes, ten minutes, thirty minutes, or an hour.

One way to design such a tamper-sensing device is to take advantage of the slight movement which is typical of any door, but especially a kennel door. An electrical switch can be mounted on the frame of the kennel such that movement of the latched door changes the position of the switch. The movement of the switch provides a signal indicating tampering with the kennel door, and only after such tampering stops for a preset period of time does will the door open.

Time-Release Leash

The invention is also directed, in certain embodiments, to a leash that releases after a preset period of time. The leash includes, for example a release mechanism at the distal end (that end nearest the dog) that releases the dog after a prescribed time period, after a cessation of frantic activity (such as pulling) or in response to an outside signal.

In an example embodiment the primary function of the release mechanism is to retain a clip which can be used to attach to a dog's collar. The mechanism is constructed to contain a timer which releases the clip from the mechanism after a given period of time. The pet owner can simply tie up the dog with the time-release leash in a location where the pet cannot do significant damage, set the timer and leave. Ideally, the timer would be set to release after the animal's anxiety has subsided. The clip would be released from the mechanism.

In an alternative embodiment, the leash is built with a release mechanism at the distal end. The primary function of the release mechanism is to retain a clip which can be used to attach to an dog's collar. The mechanism is be constructed to contain a timer which releases the clip from the mechanism after a given period of time has elapsed where the animal has not pulled on the leash. The mechanism is optionally designed such that if the animal strains against the leash it would reset the time period for release. In this manner it can be assured that the animal would have to be relatively calm for a given period of time prior to being released. The pet owner would simply tie up the animal with the activity-dependent leash in a location where the pet cannot do significant damage, set the leash to release after a certain period of time in which the leash had not been pulled, and leave.

In a further embodiment, the leash gradually releases. In some situations an animal that is suddenly released from being restrained is prone to cause damage to the owner's property. For this reason it can be desirable to have a means of restraint which is gradually released. For example, a leash constructed in accordance with the invention can allow the pet a greater range of motion over a given period of time. After being allowed a greater range of motion the pet can be released from the leash entirely as described in the sections above titled "time-release leash" and "activity-dependent leash" described above. The gradual release leash itself can be activity-regulated and/or time-regulated.

Multiple Animals in Restraints

It may be necessary to restrain multiple animals at the same time. In this case it may be desirable to not allow any animals to be released until all the animals have calmed down. In the alternative, it may be undesirable to release multiple animals simultaneously. In this event, it would be desirable to release one or at least fewer than all the animals, then allow a certain period of time to pass before releasing more animals. Thus, in certain implementations multiple release devices work in coordination to allow multiple animals to be released and allowed freedom of movement while avoiding the problems associated with separation anxiety.

Rewards and Other Issues

A similar concept to the Gradual-Release Leash is to provide the animal with a treat or some other type of positive reinforcement prior to, coincident with or following release from confinement. In the case of the Movement-Dependent Kennel Door a treat could be dispensed to the animal prior to the release of the kennel door. This would not only reward the animal for calming down but also distract the animal while the door latch is being released, thereby preventing an emotional burst of activity on being released from the kennel.

Various implementations of the invention will now be described in reference to the figures:

FIG. 1 is a drawing of a gate found on commonly available kennels. The gate 101 is attached to the frame (not shown) of the kennel by upper and lower rods 102 which function as hinge points. An upper rod 107 and a lower rod 107 retain the gate in the closed position when they are engaged in frame receptacles 108. Each rod is spring-loaded with a spring 104. Each spring acts against a stop 105 which is fixed to rod 107 and a second stop 103 which is fixed to the gate 101. The purpose of spring-loading each rod is to keep it firmly engaged with frame receptacle 108 to prevent accidental release of the kenneled animal. Each rod 107 has a handle 106 to allow manual release of the rod 107 from its receptacle 108.

Figure 2:
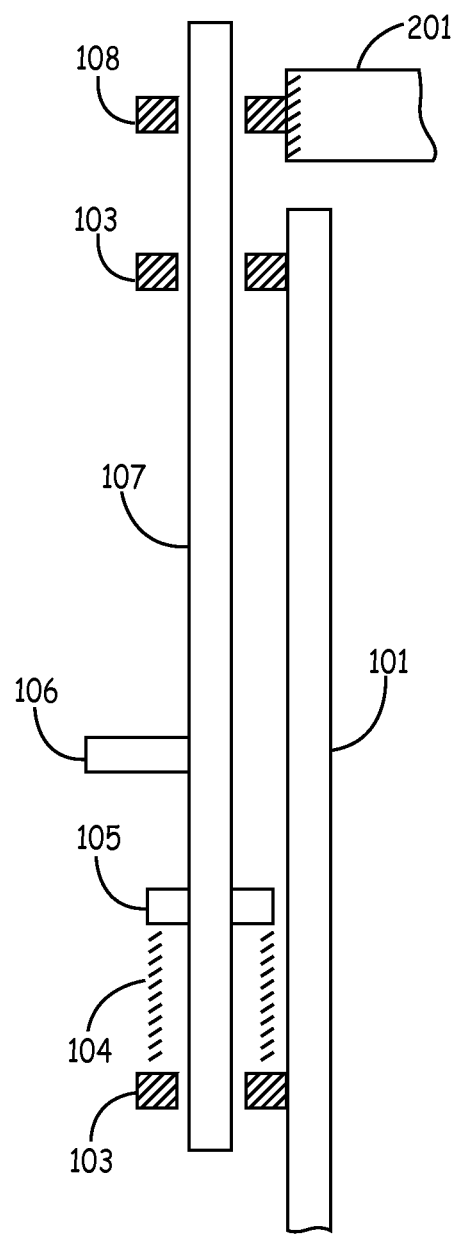
FIG. 2 is a cutaway view of the mechanism which retains the kennel gate in a closed and latched position.

FIG. 2 is a cutaway view of the mechanism which retains the kennel gate in a closed position. The frame receptacle 108 is attached to the kennel frame 201 in a position such that when rod 107 is engaged, the gate is prevented from opening. The rod 107 is free to slide though guiding elements 103 which are fixed to the gate. Spring 104 retains rod 107 in an engaged position by applying force against stop 105 which is fixed to the rod and a second stop 103 which is fixed to the gate.

Figure 3:
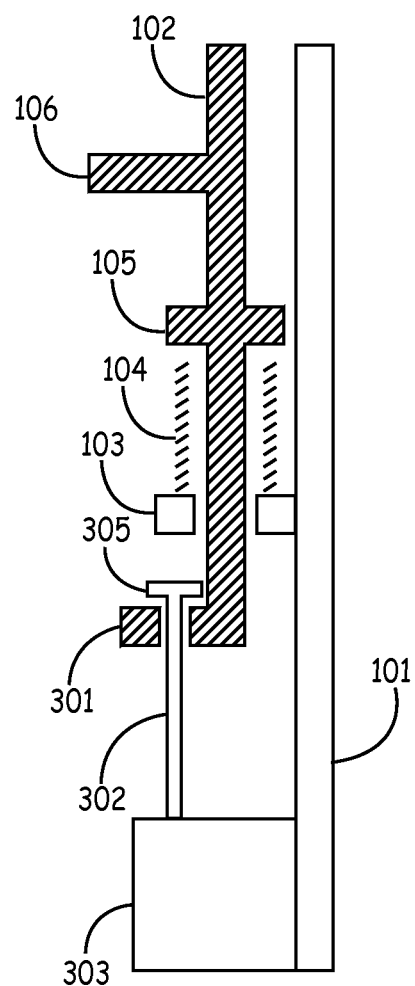
FIG. 3 is a drawing of the preferred embodiment of the actuator which can be used by the control device to release the gate latch.

FIG. 3 is a drawing of the preferred embodiment of the actuator which can be used by a control device to release the gate latch. The end of rod 102 has been modified to include a loop 301. A shaft 302 extends through loop 301. The cross-section of shaft 302 is small enough and shaft 302 is long enough to allow loop 301 to slide down far enough to release rod 102 from frame receptacle 108. Frame receptacle 108 is not shown in this figure. The shaft head 305 of shaft 302 is large enough to prevent passing through loop 301. Shaft 302 is attached to actuator 303. Actuator 303 is fixed to the gate 101. In some implementations, an animal owner may wish to restrain and later release an animal, but the owner may wish to make a decision based on current information rather than set a timer for automatic release. For example, an owner may enclose an animal and then leave his or her residence for work or other activities away from home. Via security cameras or web-cams, the owner may desire to visually monitor the behavior of the animal and make a decision to release the animal at the appropriate time. Also, it is well known that some animals have unfavorable reactions to postal workers and other delivery personnel. The owner may decide to wait until a delivery has occurred and then make a decision to release the animal. In some cases, the owner of an animal may have a service person enter the premises but may wish to keep the animal enclosed until after the service person has departed the premises. The owner may receive this information via a web-cam or other means.

In cases where the owner desires to release the animal remotely but is not able to see the enclosure via a web-cam or security camera, the owner may desire to receive a signal confirming that the enclosure has been opened.

In an example embodiment, the device contains a receiver designed to receive a signal (such as a radio signal). The receiver signal may be used to actuate the remote opening of the enclosure thereby permitting release of the animal. Alternatively, the receiver signal may be used to control the timer which may consist of stopping, resetting or disabling the timer. Alternatively, the receiver signal may be used to cause a transmitter to send a signal indicating the status of the canine which was kenneled. Examples of the status of the canine which was kenneled include, but are not limited to the following: an indicator of: whether the canine continue to be restrained or has the door been unlocked; whether the canine is in the kennel; if the canine is exhibiting behavior indicating anxiety; how much time remains on the timer, or if the timer is active. In an example embodiment, the receiver is configured to receive a signal via a local wi-fi network, or over a cellular network.

In an example embodiment, the receiver is configured to receive a signal from a home automation system, typically one that interfaces with an outside system (such as a remote access system that integrates household control over alarms, sensors, etc. including canine release).

In an example embodiment, the receiver is configured to receive a text message. In an alternative embodiment, the receiver is configured to receive a telephone call. In another embodiment, the receiver is configured to receive a signal from a security system. In an embodiment, the receiver is configured to receive a signal from a smoke alarm or hazardous gas detector. In an embodiment, the receiver is configured to receive a signal over the internet.

A method for using the device is as follows: A user places a dog with separation anxiety in the enclosure and manually lock the door to the enclosure (in the alternative, the dog is attached to a releasable leash. The user will then wait a period of time, based on their experience and send a signal to the receiver in the enclosure or attached to the leash. Upon receipt of a signal instructing the enclosure to open, a device unlocks the door; or alternatively releases the leash.

Optionally, the user may use a web-cam or other means of video streaming and remotely monitor, via visual and sound information, the anxiety level of the canine. The user may make a decision to release the canine when he or she has determined that the canine is sufficiently calm. The user will cause the enclosure to be remotely unlocked or the leash released by causing a signal to be transmitted to the receiver at the door or leash.

Optionally, the user may use a web-cam or other means of obtaining information and make a decision to release the animal remotely. For example, the owner of a canine may place the canine in an enclosure prior to departing. The owner of the canine may then wait for the completion of an event prior to sending a signal and remotely releasing the canine. In an example, a canine may become agitated when a mail or delivery person approaches a house, or a service worker or housekeeper enters the house. The owner of the canine may desire to keep the canine enclosed until the mail or delivery person or or service worker or housekeeper have departed, and then release the animal.

In an example, the enclosure may be used to enclose and later remotely release a canine that is aggressive toward strangers. In an example, the enclosure may be used to enclose a guard dog and remotely release the guard dog upon the receipt of information that an intruder has approached or entered a premises. In this example, a user may use a web-cam, security cameras or a security system to monitor the security of a building or a premises. The user may send a signal and remotely release the guard dog so that the free movement of the guard dogs serves as a deterrent to the intruder.

In an embodiment, the enclosure is configured with a transmitter to send a signal to a user that the enclosure has opened. The transmitter may (for example) send a text message, place a telephone call, or send an email. The transmitter can also send a status update to a home automation system or a security system.

In yet another embodiment the time of automatic release is based on a combination of two or more of the following: passage of time, the behavior of said restrained canine, a biological parameter of the restrained canine and an external signal. In another embodiment the restraint may be an enclosure, control of an access point or a freedom-limiting device. In another embodiment the enclosure may be a kennel, an electronic fence, a fenced-in area, a room in a home, a garage, or a doghouse. In another embodiment the access point may be a kennel gate, a pet door, a gate or a door to a room. In still another embodiment the freedom-limiting device may be a leash, collar, halter, muzzle, shock-collar or leg-restraint.

Another embodiment of the invention is a kennel for restraining a canine comprising an enclosure, a gate, a means for securing said gate to prevent liberation of said canine, and a means of automatically releasing said means of securing said gate. In another embodiment of the invention the kennel comprises a controller which determines the time of automatic release of said means of securing said gate. In another embodiment, the means of securing the gate is a latch. In another embodiment, the controller time of automatic release is based on passage of time. In another embodiment, the controller passage of time is determined by a mechanical or electrical timer.

The above specification provides a complete description of the structure and use of the invention. Since many of the embodiments of the invention can be made without parting from the spirit and scope of the invention, the invention resides in the claims.

We claim:

1. An apparatus for restraining and remotely releasing a canine, the apparatus comprising:
   an enclosure for limiting the movement of a canine, the enclosure comprising a door over an opening in the enclosure;
   a locking mechanism configured to manually lock the door after ingress of a canine into the enclosure,
   a receiver capable of receiving a signal from a remote source;
   a device configured to unlock the door upon receipt of a signal from the remote source, thereby permitting egress from the enclosure by the canine; and
   further comprising a transmitter capable of sending a signal indicating the status of the canine.

2. The apparatus of claim 1, wherein ingress and egress doors are the same.

3. The apparatus of claim 1, further comprising a transmitter capable of sending a signal indicating the door was remotely unlocked.

4. The apparatus of claim 1, further comprising a timer for releasing the locking mechanism.

5. The apparatus of claim 4, wherein the timer comprises a mechanical timer.

6. The apparatus of claim 1, further comprising a behavior monitor configured to provide an alternative signal to the device configured to unlock the door, thereby permitting egress from the enclosure by the canine in the absence of another signal.

7. The apparatus of claim 1, wherein the receiver comprises a radio receiver.

8. An apparatus for restraining and releasing a canine, the apparatus comprising:
   a device for limiting the movement of a canine;
   a receiver capable of receiving a signal;
   a release mechanism configured to release the canine from the device for limiting the movement of the canine upon receipt of the signal; and
   further comprising a behavior monitor configured to provide an alternative signal to the device configured to automatically release the canine in the absence of a signal from a timer.

9. The apparatus of claim 8, wherein the device for limiting the movement of a canine comprises a leash.

10. The apparatus of claim 8, wherein the device for limiting the movement of a canine comprises a door.

11. The apparatus of claim 8, wherein the release mechanism is configured to release the canine upon receipt of a signal from a timer.

12. The apparatus of claim 11, wherein the timer comprises an electrical timer.

13. The apparatus of claim 11, wherein the timer comprises a mechanical timer.

14. The apparatus of claim 8, wherein the release mechanism is configured to release the canine upon receipt of a signal from a remote location.

15. The apparatus of claim 8, wherein the release mechanism comprises a radio receiver.

16. The apparatus of claim 8, wherein the timer comprises a delayed release mechanism.

17. An apparatus for restraining a canine, the apparatus comprising:
- an enclosure for limiting the movement of a canine, the enclosure comprising a door over an opening in the enclosure;
- a locking mechanism configured to manually lock the door after ingress of a canine into the enclosure,
- a timer capable of producing a signal;
- a device configured to automatically unlock the door upon receipt of a signal from the timer, thereby permitting egress from the enclosure by the canine, said egress proceeding through the same opening by which ingress occurred; and
- a transmitter capable of sending a signal indicating the status of the canine which was kenneled.

18. The apparatus of claim 17, wherein the status of the canine which was kenneled indicates if the canine continues to be restrained or if the door has been unlocked.

19. The apparatus of claim 17, wherein the status of the canine which was kenneled indicates if the canine is in the kennel.

20. The apparatus of claim 17, wherein the status of the canine which was kenneled indicates if the canine continues to exhibit anxious behavior.

21. The apparatus of claim 17 further comprising a receiver capable of receiving a signal.

22. The apparatus of claim 21, wherein the signal received by the receiver can control the timer.

23. The apparatus of claim 21, wherein the signal received by the receiver causes the transmitter to send a signal indicating the status of the canine which was kenneled.

24. The apparatus of claim 21, wherein the signal received by the receiver causes the door to be unlocked.

25. An apparatus for restraining and releasing a canine, the apparatus comprising:
- a device for limiting the movement of a canine, the device for limiting the movement of a canine comprises a leash;
- a timer,
- a release mechanism configured to release the canine from the device for limiting the movement of the canine upon expiration of a time period associated with the timer, and
- a behavior monitor configured to provide an alternative signal to the device configured to unlock the door, thereby permitting egress from the enclosure by the canine in the absence of another signal.

* * * * *